Figure 1:
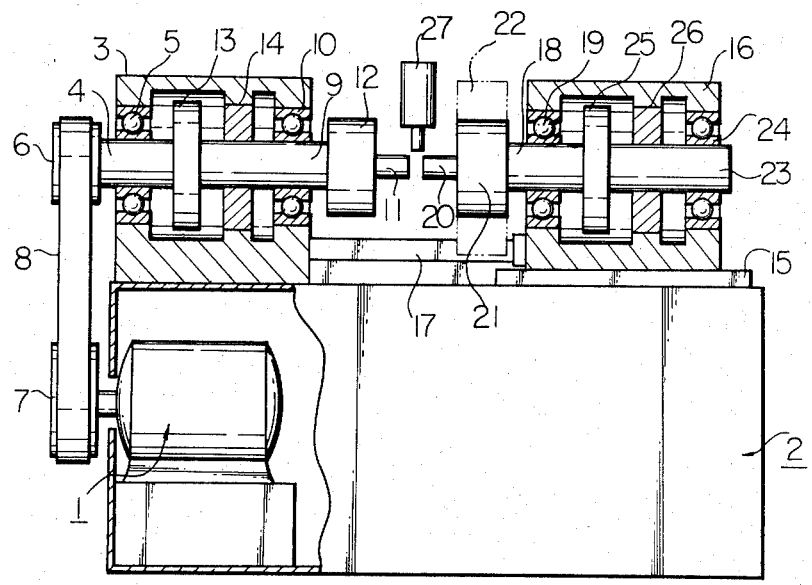

United States Patent
Takagi et al.

[15] 3,691,622
[45] Sept. 19, 1972

[54] METHOD OF AND APPARATUS FOR FRICTION WELDING

[72] Inventors: Nobuo Takagi; Takashi Takiguchi, both of Kariya, Japan

[73] Assignee: Kabushiki Kaisha Toyoda Jidoshokki Seisakusho, Kariya-shi, Aichi-ken, Japan

[22] Filed: Feb. 17, 1970

[21] Appl. No.: 12,073

[30] Foreign Application Priority Data

Feb. 20, 1969 Japan ...................44/12813

[52] U.S. Cl. .......................29/470.3, 156/73, 228/2
[51] Int. Cl. ..........................................B23k 27/00
[58] Field of Search ............29/470.3; 228/2; 156/73

[56] References Cited

UNITED STATES PATENTS

| | | | |
|---|---|---|---|
| 3,563,444 | 2/1971 | Loyd | 228/2 |
| 3,541,669 | 11/1970 | Yocum | 228/2 X |
| 3,460,734 | 8/1969 | Vill et al. | 228/2 |
| 3,234,646 | 2/1966 | Hollander et al. | 29/470.3 |
| 3,388,849 | 6/1968 | Blum et al. | 29/470.3 |

Primary Examiner—John F. Campbell
Assistant Examiner—R. J. Craig
Attorney—Robert E. Burns and Emmanuel J. Lobato

[57] ABSTRACT

An improved method and apparatus for use in rotary bi-axle type friction welding, utilizing braking and clutching systems applied to both the drive side and driven side spindles. The stopping process of the driven system is controlled by the braking and clutching systems connected to the driven side spindle, and those systems are activated alternately to effectively dissipate the resultant heat energy caused by the stopping process.

4 Claims, 5 Drawing Figures

METHOD OF AND APPARATUS FOR FRICTION WELDING

The present invention is relative to a method of and apparatus for friction welding having a rotational bi-axle. In the so-called rotary bi-axle type frictional welding process, a work piece, which is mounted on a driving spindle of the frictional welding apparatus (hereinafter, referred to as the first work-piece) and rotated positively and another work-piece which coaxially faces the first work-piece and mounted on a driven spindle of the frictional welding apparatus so as to rotate freely (hereinafter, referred to as the second work-piece) are in contact under an action of a thrusting force towards an axial direction, thereby generating heat at the contact surface by the friction, and simultaneously thereafter, the second work-piece is rotated by following the rotation of the first work-piece so as to generate heat required for welding until the time point where the rotational speed of both work-pieces becomes zero.

Generally speaking, in a rotary bi-axle type friction welding process, heat energy, which is generated at the contact portion of both work-pieces at the time of contact under pressure, is dependent upon two factors, the total moment of inertia of the driven system (hereinafter "driven system" means the driven spindle and the others which are inherent thereto) and relative rotational speed of both work-pieces. Thus, the heat energy which is suitably generated for both work-pieces made respectively from various materials and having various diameters, is adjusted by the suitable selection of the above-described factors. However, the heat energy required for the friction welding is proportional to the square of diameter of the work-piece. In addition to the above, in a frictional pressure welding method, a substantially high circular velocity is generally required for the welding process regardless of conditions of the work-pieces. Therefore, in the case of frictional welding of such work-pieces having a relatively small diameter, the relative rotational speed of the work-pieces must be set at a low value corresponding to the small diameter of the work-piece in order to obtain the required suitable heat energy. However, contrary to the above, the relative rotational speed of the work-piece must be raised since the diameter of the work-piece is small in order to secure a desired circular velocity. In other words, it is very difficult to generate the heat energy required for friction welding of such work-pieces as having small diameter by the regulation of the relative rotational speed of the work-pieces. Therefore, the suitable heat energy for small work-pieces is regulated mainly by the total moment of inertia of the driven system.

In a case where the friction welding is applied to a work-piece having a relatively large diameter, the heat energy generated at the pressurized contact surface of the work-pieces is regulated by providing a rotational mass having a large moment of inertia. However, in the above-described case, a large quantity of heat is generated at a portion of a braking device which brakes the rotation of the driven spindles and therefore it is necessary to employ a braking device having a large heat capacity.

When a braking device having a large heat capacity is used, the moment of inertia at the rotational portion of the braking device is remarkably increased and consequently results in an increase of the total moment of inertia of the driven system. Therefore, in the above-case, it is almost impossible to weld a work-piece having relatively small diameter by the frictional welding process.

A main object of this invention is to eliminate the above-described drawbacks and obtain a method and apparatus by which a friction welding of work-pieces in a wide range of diameters is readily carried out.

Another object of this invention is to obtain a friction welding apparatus having a smaller size braking device than that of the conventional frictional welding apparatus.

The frictional welding method in accordance with the present invention is mainly characterized by application of a so-called friction clutch and friction brake in the driven side of the apparatus so that, when the first and second workpieces commence to rotate at the same speed, the energy given to the driven system is converted into heat energy of the friction clutch and the friction brake until the motion of the driven system is stopped. Consequently, a friction brake having smaller capacity can be applied to the driven system in comparison with the case of application single brake. It is also a characteristic feature of the present invention that the same idea is applied for the driving system. In addition to the above features, the frictional welding of workpieces having a wide range of diameters can be satisfactorily carried out.

Other objects and features of this invention will more fully appear from the following description and the accompanying drawings and will be particularly pointed out in the claims.

Figure 2:
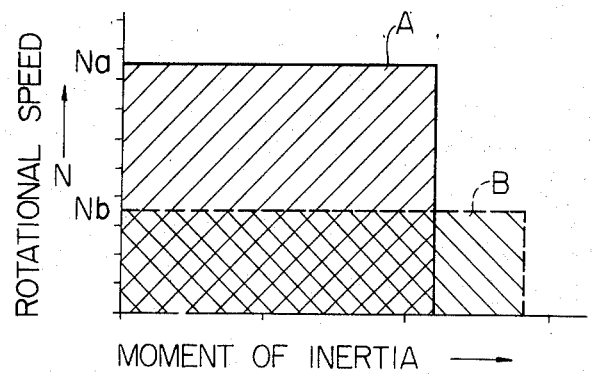
Figure 3:
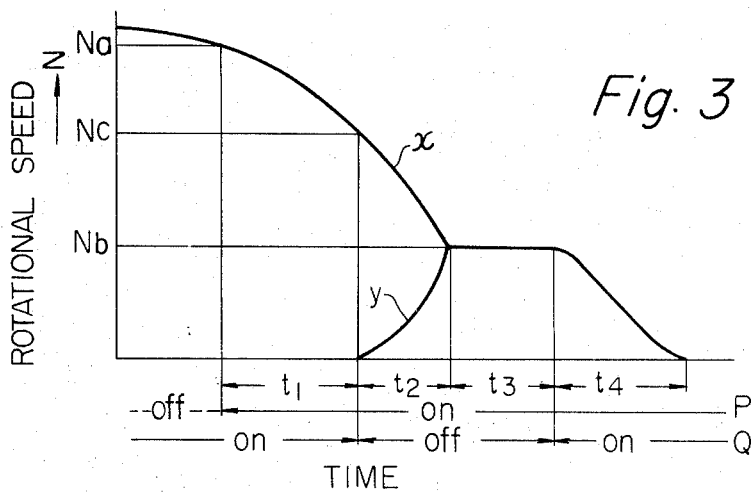
Figure 4:
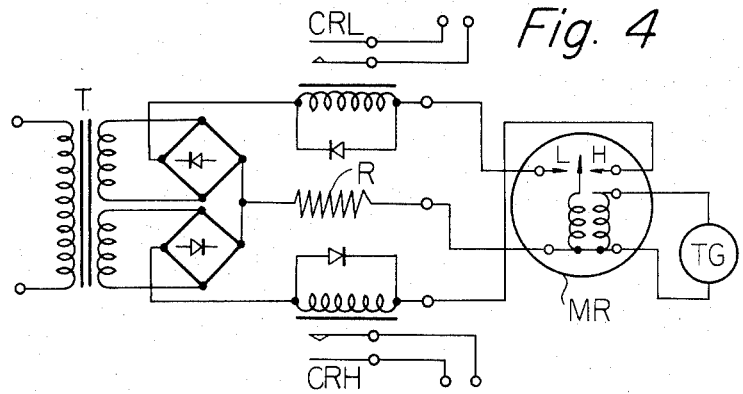
Figure 5:
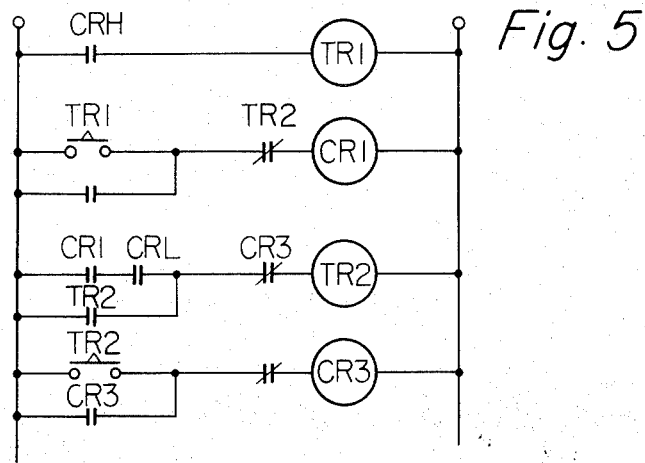

FIG. 1 is a schematic sectional diagram illustrating a side section of the friction welding apparatus in accordance with the present invention, FIG. 2 is an illustrative diagram explaining a heat quantity generated in the clutching and braking apparatus for a time interval between the time point that the welding is completed and the time point that the rotation of the driven spindle is stopped, FIG. 3 is an explanatory diagram illustrating a relationship between the time intervals wherein the clutch and brake are in operation and the rotational speed of the driven spindle and braking spindle, FIGS. 4 and 5 are explanatory wiring diagrams illustrating controlling devices which are applied in the friction welding apparatus shown in FIG. 1..

In FIG. 4 "P" and "Q" represent operational conditions of the clutch and brake respectively in relation to the time interval.

Hereinafter, the friction welding apparatus for performing the present invention will be described in the following specification and accompanying drawings.

Referring to FIG. 1, a driving motor 1 is attached to one portion of a bed 2 of the frictional welding apparatus, and a housing 3 of driving spindles is disposed at one side (left-hand side portion in the drawing) of the bed 2. A first driving spindle 4 is rotatably mounted on the left-hand side of the housing 3 by way of a bearing 5, and a belt 8 is wrapped between a driven pulley 6 which is fixed to the left-end of the first driving spindle 4 and a driving pulley 7 of the driving motor 1.

A second driving spindle 9 is rotatably mounted on another bearing 10 coaxially with the first driving spindle 4 at the right-hand side of the housing 3 for the driving spindles.

A first chuck 12 for holding the first work-piece 11 is attached to the right end of the second driving spindle 9 and a friction clutch 13 is disposed between the first driving spindle 4 and the second driving spindle 9.

A brake 14 is disposed for braking the second driving spindle 9 at one portion of the housing 3 of the driving spindles. A slide base 15 is disposed to another portion (right-hand portion of the drawing) of the bed 12, and a slidable housing 16 for a driven spindle is mounted thereon so as to slide in forward and backward directions. The slidable housing 16 is connected to a piston rod 17 which is operated by a thrust cylinder (not shown in the drawing.)

A driven spindle 18 is rotatably mounted on the left-hand side of the slidable housing 16 by way of a bearing 19 and in a condition coaxially arranged with the first and second driving spindles. A second chuck 21 for the second work-piece 20 is attached to the left-hand end of the driven spindle 18 facing the first chuck (12) for holding the first work-piece 11. In this embodiment, the above-mentioned chucks 12 and 21 are automatic chucks utilizing an hydraulic pressure control system.

A rotational mass 22 is attached to the driven spindle 18 in a detachable relationship. The above-mentioned rotational mass body 22 is composed of a suitable number of multi-discs and these multi-discs are also in a detachable relationship with respect to each other.

A braking spindle 23 is rotatably disposed at the right-hand side of the slidable housing 16 by way of a bearing 24 and connected to the driven spindles 18 through a friction clutch 25. A brake 26 is disposed at one portion of the slidable housing 16 in order to brake the braking spindles 23. A cutting tool 27 is provided for cutting down upsets generated at the contact portions of the first and second work-pieces. A cone clutch or a disc clutch, which are well-known clutches as shown in Mark's Standard Handbook For Mechanical Engineering, (page 8 – 54), can be satisfactory utilized. Further, in this embodiment, a disk brake or a multidisk brake, or a wet-type multidisk electro-magnetic clutch is used as the brakes 14 and 26.

Successively hereinafter, a process for frictional pressure welding will be more concretely described.

As the driving motor 1 is driven, the first driving spindle 4 is rotated by way of the driving pulley 7, belt 8 and driven pulley 6. Next, the second driving spindle 9 is driven by way of clutch 13 and consequently, the first work-piece 11 is rotated by way of the first chuck 12 attached to the second driving spindle 9. In this condition, the slidable housing 16 is forwarded by the piston rod 17 (transferred towards the left-hand direction in FIG. 1), and next, the second work-piece 20, which is held rigidly by the second chuck, contacts the first work-piece 11 under a predetermined thrust force.

Then, the work-piece 20 of the driven spindle begins to rotate following the rotation of the first work-piece attached rigidly to the driving spindle 9 and the rotational speed of the work-piece 20 is gradually accelerated. In this condition, frictional heat is generated at the contact surface of both work-pieces 11, 20 due to the frictional action of both work-pieces and a plastic deformation is observed locally at the contact surface of both work-pieces by the frictional heat. As the rotational speed of the second work-piece 20 gradually increases, the rotation of the driven spindle 18 is synchronized with that of the driving spindles 4, 9 and the relative rotational speed of both work-pieces becomes zero. At this condition, the generation of friction heat at the contact surface of both work-pieces is ceased. Thereafter, the input to the second driving spindle 9 is cut and the friction welding of both work-pieces 11, 20 is completed under holding the above-mentioned thrust force for a predetermined time interval.

If the diameters of both work-pieces 11, 20 to be friction welded are relatively small, the rotational mass 22, which is attached to the driven spindle 18, can be either eliminated or decreased in its mass so as to decrease the total moment of inertia of the driven system, and thereby, a suitable quantity of friction heat for the work-piece of small diameter can be acquired.

Contrary to the above, if the diameters of the work-pieces to be friction welded are relatively large, a suitable number of the rotational mass 22 are added to the driven spindle 18 so as to increase the total moment of inertia of the driven system and in turn, so as to acquire a suitable quantity of frictional heat for the work-piece of large diameter.

After the completion of the welding, the first work piece is released from the first chuck 12 by releasing the hydraulic pressure and then the slidable housing 16 is transferred backwards holding the work-piece 11, 20 which continues rotating with the driven spindle 18.

Next, a system and method for stopping the rotation of the freely rotating driven spindle 18 will be explained referring to FIG. 3. The braking spindle 23 is previously locked against rotation by the actuation of the brake 26 which is effected by closing a braking circuit thereof while the driven spindle 18 rotates at a rotational speed of $Na$, and then the driven spindle 18 is engaged with the braking spindle 23 by actuation of the friction clutch 25 of the driven system.

In the above case, if the diameters of the work-pieces 11, 20 to be welded are small, the total moment of inertia of the driven system is so small that the heat quantity generated at the friction clutch 25 is trivial. However, if the diameter of the work-pieces 11, 20 to be welded are large the total moment of inertia of the driven system is predetermined as substantially large in proportion to the frictional heat energy which is generated at the time of welding. Therefore, if the rotation of the driven spindle 18 is stopped in the same manner with the conventional friction welding apparatus having a single braking device, as a matter of course, a substantially large quantity of heat energy is generated in the friction clutch 25 of the driven system.

The present example is relative to a method by which not only the brake but also the clutch properly take over a portion of generating the heat quantity. In other words, as the driven spindle 18 is engaged with the stationary braking spindle 23 by actuating the friction clutch 25 immediately thereafter, the rotational speed of the driven spindle 18 begins to decrease from $Na$ following a curved path as shown at x in FIG. 3. When the rotational speed of the driven spindle 18 has reached a predetermined rotational speed $Nc$, in other words, when a first time interval $t_1$ has passed from the time point when the clutch 25 was actuated to engage the driven spindle 18 to the braking spindle 23, the brake 26, which brakes the braking spindle 23, is released from its locked position thereby permitting rotation of the braking spindle 23. A detection of the passing time $t_1$ is carried out by applying a meter-relay or a timer. In the above-described conditions, the braking spindle 23, which was released from its braking operation, begins to rotate following the rotation of the driven spindle 18 and then further increases its rotational speed following the curved path y, which is shown in FIG. 3. While, as above-mentioned, the rotational speed of the driven spindle 18 is decreased gradually following the curved path x as shown in FIG. 3, and consequently, after passage of a second time interval $t_2$ from being released from the braking operation of the brake 26, the rotational speed of the driven spindle 18 which was gradually reduced is synchronized with the rotational speed $N_b$ of the braking spindle 23 which was gradually increased. Therefore, after passage of a third time interval $t_3$ from the time point of the synchronization of the rotational speed of both the driven spindle 18 and the braking spindle 23 (a time interval $t_3$ is not always necessary), the friction brake 26 again actuates under a condition of connecting the clutch 25 of the driven system, and the speed x and y of the driven spindle 18 and the braking spindle 23 are gradually decreased from $N_b$, concurrently rotating with each other in a synchronized conditions by way of the friction clutch 25 of the driven system. Then, after passage of a fourth time interval $t_4$, the above-mentioned rotational speed of the driven spindle 18 and the braking spindle 23 become zero. In other words, the rotation of both spindles is stopped completely.

In the above-described manner, the rotation of the driven spindle 18 is stopped, but in the mean time, the rotational energy of the driven spindle 18 and the braking spindle 23 is changed into heat energy during the time interval $t_1 + t_2$ which extends from the friction time point when the clutch 25 connects the driven spindle 18 and the braking spindle 23, to the time point when the rotational speed of the driven spindle 18 is synchronized with that of the braking spindle 23. The above-mentioned heat energy which is changed from the rotational energy, is generated only at the friction portion of the clutch 25 of the driven system.

On the other hand, during the time interval $t_4$, which extends from the time point when the brake 26 is actuated a second time after the rotational speed of the driven spindle 18 was synchronized with that of the braking spindle 23 to the time point when the rotation of the driven spindle 18 is stopped together with the braking spindle 23, as the driven spindle 23 and the braking spindle 23 are rotated as one body by means of the friction clutch 25, the rotational energy of the driven spindles 18 and the braking spindles 23 is absorbed into the brake 26 and then changed into heat energy in the brake 26.

In the above-described condition and after a completion of the pressure welding, the total rotational energy stored in the driven system is due to the total moment of inertia of the driven system (summing up the second chuck 21), the rotational mass 22 and the driven spindle 18, and corresponds to the area shown as A in FIG. 2. The rotational energy which is changed into heat energy of the portion of the brake 26 is due to the total moment of inertia of the driven system and braking spindle 23 and corresponds to the area shown as B in FIG. 2. Therefore, the transferred heat energy at the portion of the clutch 25 corresponds to the area A–B (ref. to FIG. 2). In other words, according to the present invention, the heat energy which is changed from the rotational energy of the driven system and generated at the portions of the friction clutch 25 and brake 26 is skillfully regulated by adjusting the above-described time interval $t_1$ which extends from the time point when the clutch 25 of the driven spindle 18 is connected immediately after completion of the friction welding to the time point when the brake 26 is released from its action. Therefore, the drawback where the heat energy is generated only confining at the portion of the brake 26 is skillfully eliminated and a braking effect to the braking spindle 23 is effectively operated to the rotation of the driven spindle 18 even in a condition of small capacity of the braking force contrary to a large capacity of the braking force as observed in the conventional braking technique provided in the friction welding apparatus.

The friction clutch 13 and the brake 14 have functions which are similar to those of the clutch 25 and the brake 26, respectively. When the first workpiece 11 is released from the first chuck 12 by releasing the hydraulic pressure after completion of the welding, the friction clutch 13 is released and next the brake 14 is actuated so as to stop the second driving spindle 9. As the second driving spindle 9 is inertially rotated after releasing the friction clutch 13, the energy required to stop the rotation of the second driving spindle 9 is not so large in comparison with a friction welding machine without a friction clutch in the driving system. Consequently, a brake 14 having a small capacity can be satisfactorily utilized.

In the above-mentioned embodiment, after completion of the frictional welding, the gripping of the first chuck 12 is released. However, it is also possible that the second chuck 21 can be released instead of the first chuck 12, so that the rotation of the second driving spindle 9 is stopped by the action of the brake 14 while the driven spindle 18 is stopped as mentioned above.

Each above-described operation of the welding apparatus is regulated by a controlling device such as shown in FIG. 4 and FIG. 5. The controlling devices comprise a rotary generator TG, which is connected to the driven system, a meter-relay MR attached to the rotary generator TG, relays CRH and CRL which are actuated by signals of the meter-relay MR, a relay TR1 which releases the clutch attached to the driving spindles 4, 9 from its operation by an output signal of the rotary generator TG, another relay CR1 which changes a thrust force, which is generated from the thrust cylinder into zero by the output signal of the rotary generator and opens any one of the chucks and then simultaneously moves the slidable housing 16 backwards and further actuates the clutch 25 of the driven system in a connected condition, yet another relay TR2 which actuates the brake 26 of the braking spindle 23 in a released condition by the output signal of the meter-relay MR and a relay CR3 which actuates the brake 26 of the braking spindle 23 in a condition of its operation contrary to the function of the above relay TR2. Further, referring to FIG. 4 and FIG. 5, contact points H and L correspond to a high speed and low speed ranges, respectively.

Next, the operations of the above-described controlling devices will be particularly explained. As the rotational speed of the driven spindle 18 becomes equal to that of the driving spindle 9, (since, the rotational speed of the driving spindle 9 is previously determined, it is not necessary to detect the number of rotations of the driving spindle), 1. referring to FIG. 4, an electro-motive-force corresponding to position of contact point H, which was predetermined by the meter-relay MR, is generated by the rotary generator TG connected to the driven spindle 18, therefore, the contact point H of the meter-relay MR is closed and then the relay CRH is also closed, 2. when the relay CRH is closed, an electric circuit concerning the clutch 13 disposed to the driving spindle 9 (a wet-type multi-plate electromagnetic clutch) is opened so as to release clutch 13 and immediately thereafter, the relay TR1 begins to count the time interval, 3. when the relay TR1 counts up, the other relay CR1 is actuated, and the following operations (a), (b) and (c) are carried out:
   a. a magnet valve (now shown in the drawing) disposed at the pipe for liquid which is connected to the thrust cylinder, is operated by a commanding signal of the relay-circuit described above so as to change the thrust force into zero,
   b. a decrease of the thrust force is detected by a pressure-sensitive switch (now shown in the drawing) and the above-described magnet valve is changed-over corresponding to a confirmation signal of the above-described detection of the pressure-sensitive switch so as to release the welded work-piece from the holding by opening the first chuck 12, and
   c. the opening of the above-described first chuck 12 is detected by another pressure-sensitive switch (not shown in the drawing) and the magnetic valve is changed over corresponding to a confirmation signal of the above-mentioned pressure-sensitive detector so as to begin to move the slidable housing 16 backwards, and then simultaneously the clutch 25 of the driven system connects the braking spindle 23 and the driving spindle 18 by the confirmation signal.

4. as shown in FIGS. 3 and 4 when the clutch 25 of the driven system is connected, the rotational speed of the driven spindle 18 is reduced so as to reach a predetermined rotational speed corresponding to the predetermined position of the contact point L of the meter-relay MR, 5. when the contact point L of the meter-relay MR is closed, the relay CRL is also closed (ref. to FIG. 4), 6. when the relay CRL is closed, the relay TR2 begins to count the time interval, and simultaneously, the electric circuit concerning the brake 26 (a wet-type multi-plate electro magnetic brake) of the braking spindle 23 is actuated into a condition of "off" and therefore, the brake 26 is released from its braking action, 7. a time interval which is predetermined by the relay TR2 is chosen as a time interval which is the shortest and is sufficient enough for acquiring a same rotational speed for both the braking spindle 23 and driven spindle 18. In other words, as shown in FIG. 3, a time interval $t_2 + t_3$ is predetermined, but in some cases, a time interval $t_3$ can be zero, 8. when the relay TR2 counts up, the relay CR3 is actuated so as to close the electric circuit concerning the brake 26 by the signal thereof, and the brake 26 again begins its action, and finally 9. both the driven spindle 18 and braking spindle 23 are stopped together in their revolution.

As described above in detail, the features and advantages of this invention are relative to a method wherein a time interval $t_1$, which extends from the time point when the clutch 25 connected to the time point when the brake 26 is released from its action, is suitably regulated so that not only the brake 26 but also the clutch 25 of the driven system, properly takes over a portion of absorbing the rotational energy and generating the heat quantity. Therefore a heat capacity of the brake 26 is reduced in accordance with the proper distribution of the rotational energy and thus, a welding of any work piece having a wide range of diameters is performed easily and with high efficiency by an application of the present invention.

What we claim is:

1. In a rotary bi-axle type friction welding apparatus for effecting friction welding of two work-pieces and having a first automatically controlled chuck for releasably holding one work-piece, a driving spindle coaxially holding said first chuck, a first housing rotatably mounting said driving spindle thereon, driving means releasably connected to said driving spindle for rotationally driving same, a driven spindle disposed in axial alignment with said driving spindle, a second chuck for releasably holding the other workpiece mounted on an end of said driven spindle facing said first chuck, a second housing rotatably supporting said driven spindle, and means for urging said first and second chucks toward and away from each other, an improvement comprising a system for stopping the rotational movement of said driven spindle upon completion of the friction welding of the two work-pieces comprising a braking spindle rotatably mounted on said second housing in axial alignment with said driven spindle, braking means operative when actuated for releasably braking rotational movement of said braking spindle and permitting rotational movement of said braking spindle when not actuated, friction clutch means operative when actuated for releasably connecting said driven spindle to said braking spindle, and means for selectively and successively effecting concurrent actuation of both said friction clutch means and braking means for a first time interval followed by actuation of only said friction clutch means for a second time interval followed by concurrent actuation of both said friction clutch means and braking means for a third time interval to stop the rotational movement of said driven spindle.

2. An improvement according to claim 1, wherein said braking means is a wet-type multi-disk electromagnetic brake.

3. An improvement according to claim 1, wherein said clutch means is a wet-type multi-disk electro-magnetic clutch.

4. In a method for carrying out frictional welding of two workhpieces by a bi-axle rotary type frictional welding apparatus including a driving spindle having a driving force applied thereto, a braking spindle having a brake, a driven spindle connected to said braking spindle through a friction clutch and means for releasably mounting the work-pieces on the respective driving and driven spindles for frictional engagement; an improvement comprising the steps of detecting the rotational speeds of the driving and driven spindles, actuating the brake on the braking spindle, removing the driving force applied to said driving spindle immediately after a relative rotational speed of the work-pieces held by said driving and driven spindles becomes zero, releasing only one of said work-pieces from its associated spindle, actuating said friction clutch for concurrent operation with the previously actuated brake, deactuating said brake when the rotational speed of said driven spindle decreases to a predetermined value, and again actuating said brake after rotation of said braking spindle is accelerated and synchronized with that of said driven spindle, thereby stopping rotational movement of said driven and braking spindles.

* * * * *